(12) United States Patent
Matsumura et al.

(10) Patent No.: US 12,621,381 B2
(45) Date of Patent: May 5, 2026

(54) MOBILE PHONE DEVICE

(71) Applicant: Sony Group Corporation, Tokyo (JP)

(72) Inventors: Kenicirou Matsumura, Tokyo (JP); Kuniichiro Naruse, Tokyo (JP); Keita Saito, Tokyo (JP); Akira Kurosawa, Tokyo (JP); Hiroki Takagaki, Tokyo (JP); Kiwako Miura, Tokyo (JP); Yuki Kobayashi, Tokyo (JP); Takehisa Gokaichi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 445 days.

(21) Appl. No.: 18/042,337

(22) PCT Filed: Sep. 7, 2021

(86) PCT No.: PCT/JP2021/032913
§ 371 (c)(1),
(2) Date: Feb. 21, 2023

(87) PCT Pub. No.: WO2022/050429
PCT Pub. Date: Mar. 10, 2022

(65) Prior Publication Data
US 2023/0362286 A1      Nov. 9, 2023

(30) Foreign Application Priority Data

Sep. 7, 2020      (JP) ................................. 2020-149881

(51) Int. Cl.
*H04M 1/02*         (2006.01)
*H04M 1/03*         (2006.01)
(Continued)

(52) U.S. Cl.
CPC ....... *H04M 1/0266* (2013.01); *H04M 1/0214* (2013.01); *H04M 1/0241* (2013.01);
(Continued)

(58) Field of Classification Search
CPC ............. H04M 1/0266; H04M 1/0214; H04M 1/0241; H04M 1/56; H04M 1/57; H04M 1/575; H04M 2250/16
See application file for complete search history.

(56) References Cited

U.S. PATENT DOCUMENTS 5,276,916 A * 1/1994 Pawlish .............. H04M 1/0214
                                                              455/350
5,463,687 A * 10/1995 Takizawa ............ H04M 1/0245
                                                              379/433.06

(Continued)

FOREIGN PATENT DOCUMENTS

CN            1400842 A      3/2003
JP       2003-18078 A      1/2003
(Continued)

OTHER PUBLICATIONS

International Search Report and Written Opinion mailed on Dec. 7, 2021, received for PCT Application PCT/JP2021/032913, filed on Sep. 7, 2021, 8 pages including English Translation.

*Primary Examiner* — Lewis G West
(74) *Attorney, Agent, or Firm* — XSENSUS LLP

(57) ABSTRACT

A mobile phone device includes: a display device that switches a display state between first and second display states; a communication unit that executes a call between a first user and a second user who makes a call using another phone device; an image generation unit that generates a first image indicating first information including a phone number of the another phone device based on identification information and generates a second image indicating second information related to the second user based on the identification information; a detection unit that detects a switching operation by the first user to switch the display state of the display device from the first display state to the second display state; and, a display control unit that changes the (Continued)

display state to the second display state and causes the display device to display the second image in a case where the switching operation is detected.

19 Claims, 10 Drawing Sheets

(51) Int. Cl.
  *H04M 1/26* (2006.01)
  *H04M 1/56* (2006.01)
(52) U.S. Cl.
  CPC ............... *H04M 1/03* (2013.01); *H04M 1/26* (2013.01); *H04M 1/56* (2013.01)

(56) References Cited

U.S. PATENT DOCUMENTS

| | | | | |
|---|---|---|---|---|
| 6,434,404 B1* | 8/2002 | Claxton | ................ | H04M 1/605 455/575.3 |
| 7,313,389 B1* | 12/2007 | Sharp | ................ | H04M 1/72403 455/418 |
| 8,005,518 B1* | 8/2011 | Birsel | ................ | G06F 3/04886 455/90.3 |
| 8,265,705 B2* | 9/2012 | Lee | .................... | H04M 1/0241 345/169 |
| 10,520,983 B2* | 12/2019 | Kwon | .................... | G06F 3/147 |
| 11,042,192 B2* | 6/2021 | Choi | .................... | G06F 1/1641 |
| 2003/0224832 A1* | 12/2003 | King | ................... | H04M 1/0214 455/566 |
| 2004/0185920 A1* | 9/2004 | Choi | ................... | H04M 1/0245 455/575.1 |
| 2004/0203491 A1* | 10/2004 | Mori | ................... | H04M 1/0245 455/569.1 |
| 2006/0148540 A1* | 7/2006 | Satoh | ................. | H04M 1/0212 455/575.3 |
| 2010/0075726 A1* | 3/2010 | Han | .................... | H04M 1/0235 455/575.3 |
| 2010/0245240 A1* | 9/2010 | Heringslack | ........ | H04M 1/0241 345/156 |
| 2010/0298033 A1* | 11/2010 | Lee | ........................ | G06F 1/1616 455/566 |
| 2018/0364827 A1* | 12/2018 | Chung | ................. | G06F 1/1677 |
| 2020/0076933 A1* | 3/2020 | Xiao | ..................... | G06F 1/3265 |
| 2020/0089462 A1 | 3/2020 | Noguchi | | |
| 2022/0222027 A1* | 7/2022 | Zhang | .................... | G06F 1/3215 |

FOREIGN PATENT DOCUMENTS

| | | |
|---|---|---|
| JP | 2019-67309 A | 4/2019 |
| JP | 2020-46553 A | 3/2020 |
| WO | WO-2014043880 A1 | 3/2014 |

* cited by examiner

TBL

| PHONE NUMBER | NAME | |
|---|---|---|
| 03-3800-2100 | TOKYO HOSPITAL | r |
| 080-1234-5678 | ICHIRO SUZUKI | r |
| 03-5533-1001 | ABC PIZZA HOUSE | r |
| ... | ... | |

B21

B31

A GO STRAIGHT TO NORTH FOR 150mm

ABC PIZZA

PIZZA ABC
4.0 ★★★★☆
◇MENU
·MARGHERITA
·MIXED PIZZA
·SPECIAL PIZZA

HARAJUKU  26 MINUTES (1.2km)

OPEN OPEN AT 10:00

PUT YOUR HANDS TOGETHER AND PUSH FROM ABOVE

MOBILE PHONE DEVICE

CROSS-REFERENCE TO RELATED APPLICATIONS

The present application is based on PCT filing PCT/JP2021/032913, filed Sep. 7, 2021, which claims priority to Japanese Application No. 2020-149881, filed Sep. 7, 2020, the entire contents of each are incorporated herein by reference.

FIELD

The present invention relates to a mobile phone device.

BACKGROUND

In recent years, smartphones capable of displaying various types of information as well as being used for phone calls have become widespread. Patent Literature 1 discloses a foldable smartphone having both portability and a large screen display. This smartphone is in a small screen display state when the main body is closed, and is in a large screen display state when the main body is opened. When the first user makes a call with the second user by using the smartphone, the smartphone is usually used with the main body closed. Then, the phone number of a phone device used by the second user and the name of the second user may be displayed on the small screen of the smartphone.

CITATION LIST

Patent Literature

Patent Literature 1: JP 2019-67309 A

SUMMARY

Technical Problem

By the way, in a case where the first user makes a call with the second user, if information regarding the second user can be known during the call, good communication with the second user can be made. However, in the conventional smartphone, in a case where information regarding the second user other than the phone number and the name is displayed on a large screen during a call, the first user needs to operate the smartphone in the large screen display state.

The present invention has been made in view of the above circumstances, and an object of the present invention is to improve operability of a mobile phone device.

Solution to Problem

1. A mobile phone device that is one aspect of the present invention includes: a display device capable of switching a display state between a first display state and a second display state in which a display area is larger than a display area in the first display state; a communication unit that executes a call between a first user of the mobile phone device and a second user who makes a call using another phone device; an image generation unit that generates a first image indicating first information including a phone number of the another phone device based on identification information for identifying the another phone device, and generates a second image indicating second information related to the second user including information other than the first information based on the identification information; a detection unit that detects a switching operation by the first user to switch the display state of the display device from the first display state to the second display state; and a display control unit that causes the display device to display the first image in a case where the display state of the display device is the first display state, and changes the display state of the display device to the second display state and causes the display device to display the second image in a case where the switching operation is detected by the detection unit.

Advantageous Effects of Invention

According to the present invention, the first user can display the second image indicating the second information on the second user on the display device by switching the display state of the display device from the first display state to the second display state. Therefore, operability of the mobile phone device is improved.

BRIEF DESCRIPTION OF DRAWINGS

FIG. 10 is an explanatory diagram illustrating an example of a second image displayed on the mobile phone device.

DESCRIPTION OF EMBODIMENTS

First Embodiment

Figure 1A:
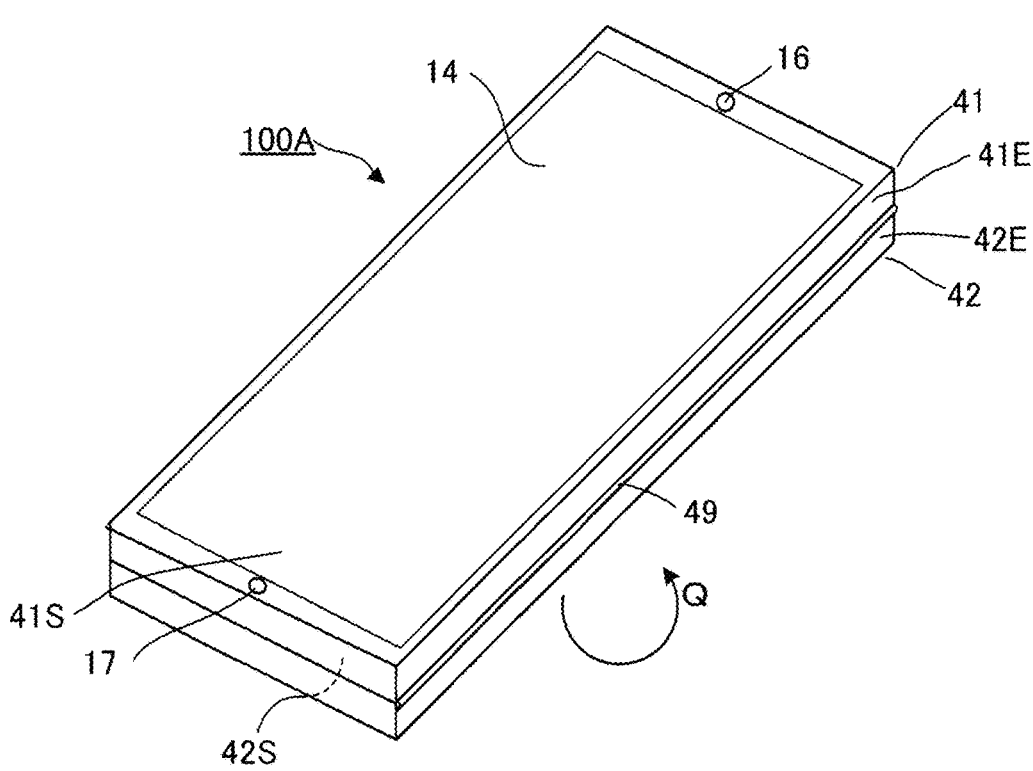
FIG. 1A is a perspective view illustrating an appearance of a mobile phone device according to a first embodiment of the present disclosure in a first display state.
Figure 1B:
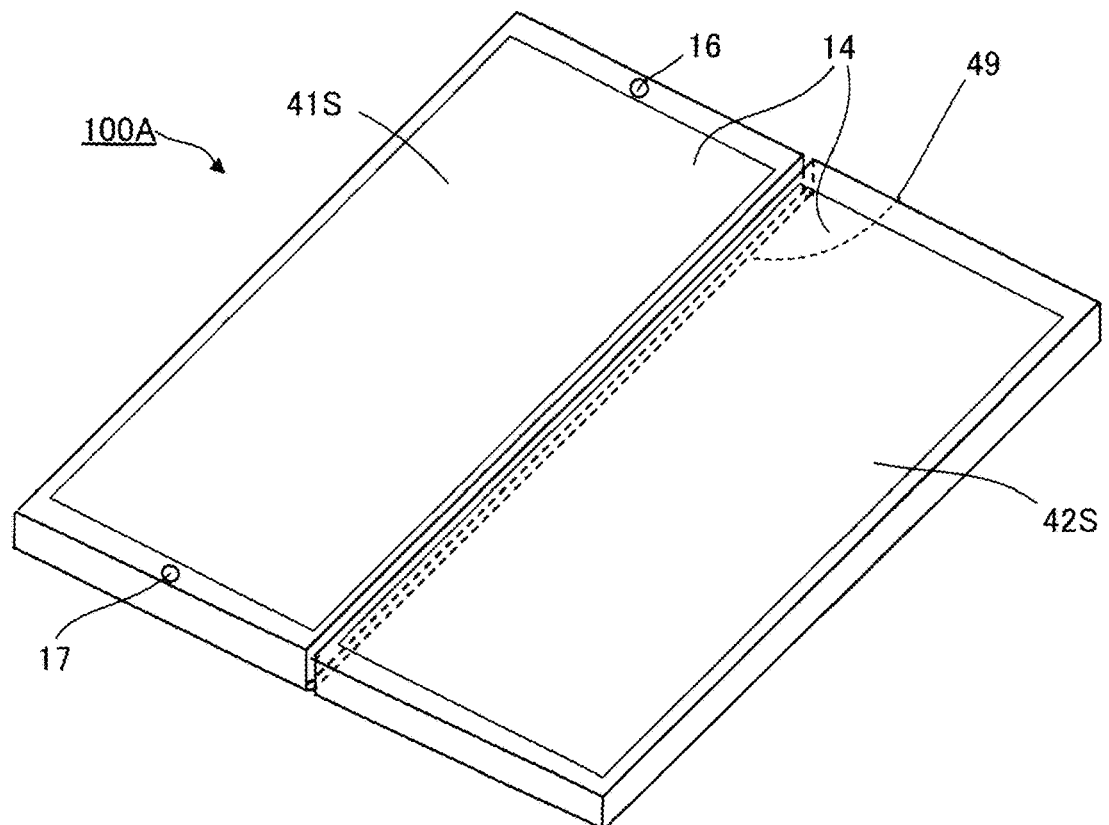
FIG. 1B is a perspective view illustrating an appearance of the mobile phone device in a second display state.

FIGS. 1A and 1B are perspective views illustrating an appearance of a mobile phone device 100A according to a first embodiment of the present disclosure. The mobile phone device 100A according to the present embodiment is a smartphone. Note that the mobile phone device 100A may be a mobile phone other than a smartphone or may be a portable information processing device having a call function. Furthermore, in the following description, it is assumed that the first user uses the mobile phone device 100A to talk with the second user who is a user of another phone device.

As illustrated in FIGS. 1A and 1B, the mobile phone device 100A includes housings 41 and 42 and a hinge 49. Each of the housings 41 and 42 is a housing having a rectangular parallelepiped plate shape. The housing 41 has a rectangular display surface 41S on one of the front and back two surfaces, and the housing 42 has a rectangular display surface 42S on one of the front and back two surfaces. The display surfaces 41S and 42S are display surfaces of a display device 14 (see FIG. 2) included in the mobile phone device 100A. In the present embodiment, the display surfaces 41S and 42S have the same display area. In addition, the housing 41 is provided with a speaker 16 and a microphone 17. The speaker 16 and the microphone 17 are used, for example, when the first user uses the mobile phone device 100A to talk with the second user.

An end surface 41E is one of two end surfaces on the long side of the front and back two surfaces of the housing 41 among four end surfaces. Similarly, the housing 42 has four rectangular end surfaces surrounding the front and back two surfaces thereof. An end surface 42E is one of two end surfaces on the long side of the front and back two surfaces of the housing 42 among the four end surfaces. The hinge 49 is a so-called hinge that rotatably connects the housings 41 and 42. The hinge 49 connects a long side opposite to the long side facing the display surface 41S on the end surface 41E and a long side opposite to the long side facing the display surface 42S on the end surface 42E.

In the present embodiment, the hinge angle formed by the display surfaces 41S and 42S changes as the hinge 49 rotates. In the present embodiment, by setting the hinge angle to 360 degrees to cause the display surfaces 42S and 41S to face outward as illustrated in FIG. 1A, the first user can bring the display state of the display device 14 of the mobile phone device 100A into a first display state in which display is performed only on the display surface 41S. In addition, by setting the hinge angle to 180 degrees, the first user can cause the display surfaces 41S and 42S to face the first user as illustrated in FIG. 1B. By this operation, the display state of the display device 14 of the mobile phone device 100A becomes a second display state in which display is performed on both the display surfaces 41S and 42S. The display area in the second display state is larger than the display area in the first display state.

Figures 2, 3:
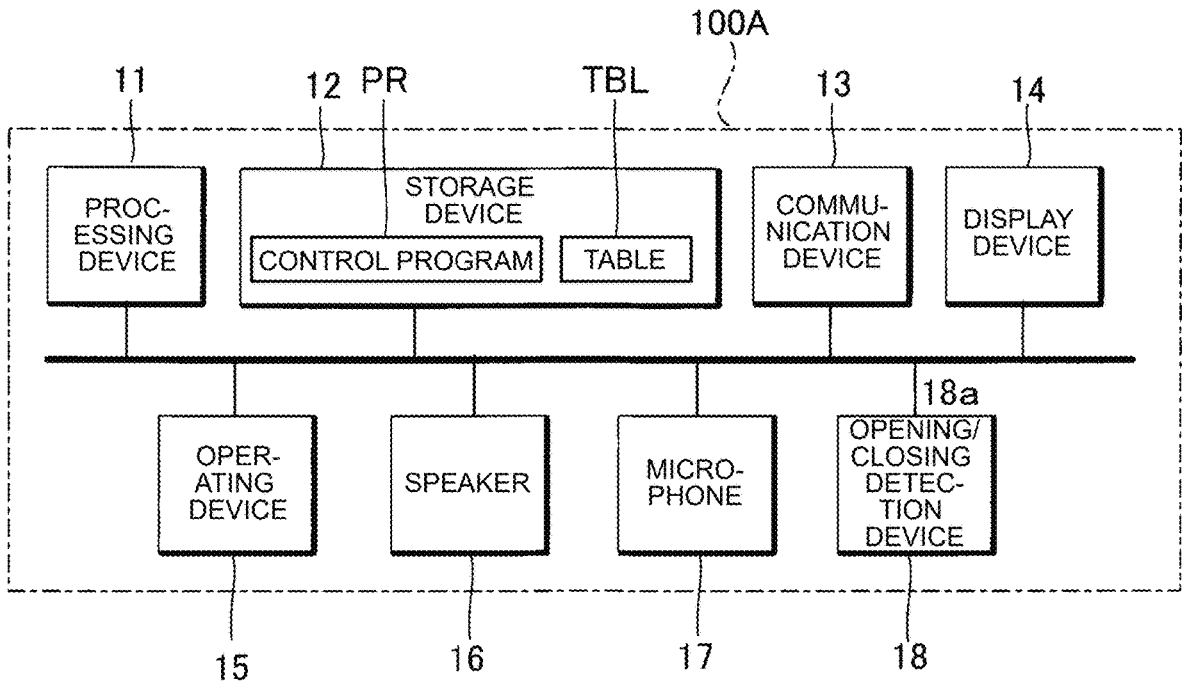
FIG. 2 is a block diagram illustrating a hardware configuration of the mobile phone device.
FIG. 3 is an explanatory diagram illustrating stored contents of a table stored in a storage device of the mobile phone device.

FIG. 2 is a block diagram illustrating a hardware configuration of the mobile phone device 100A. As illustrated in FIG. 2, the mobile phone device 100A is a computer including a processing device 11, a storage device 12, a communication device 13, the display device 14, an operating device 15, the speaker 16, the microphone 17, and an opening/closing detection device 18. The respective elements of the mobile phone device 100A are connected to each other by a single or a plurality of buses. Note that the term "device" in the present application may be replaced with another term such as a circuit, a device, or a unit. In addition, each element of the mobile phone device 100A includes one or a plurality of devices, and some elements of the mobile phone device 100A may be omitted.

The processing device 11 is a processor that controls the entire mobile phone device 100A, and includes, for example, one or a plurality of chips. The processing device 11 includes, for example, a central processing unit (CPU) including an interface with a peripheral device, an arithmetic device, a register, and the like. Some or all of functions of the processing device 11 may be implemented by hardware such as a digital signal processor (DSP), an application specific integrated circuit (ASIC), a programmable logic device (PLD), or a field programmable gate array (FPGA). The processing device 11 executes various types of processing in parallel or sequentially.

The storage device 12 is a recording medium readable by the processing device 11, and stores a plurality of programs to be executed by the processing device 11 and various data to be used by the processing device 11. The plurality of programs includes a control program PR. The various types of data include a table TBL. The storage device 12 includes, for example, a nonvolatile storage circuit such as a read only memory (ROM), an erasable programmable ROM (EPROM), or an electrically erasable programmable ROM (EEPROM), and a volatile storage circuit such as a random access memory (RAM).

FIG. 3 is an explanatory diagram illustrating stored contents of the table TBL. The table TBL stores data of a so-called telephone directory. As illustrated in FIG. 3, the table TBL stores a plurality of records r. One record r is a set of a phone number and a name. The name includes a nickname, a name, and a designation. The names include "first name", "surname", "name", "company name", "trade name", and "facility name".

The communication device 13 is a device that communicates with another device via a communication network such as a mobile communication network or the Internet. The communication device 13 is also referred to as, for example, a network device, a network controller, a network card, or a communication module. For example, an application program received by the communication device 13 from a distribution server (not illustrated) via a communication network is stored in the storage device 12. Furthermore, the communication device 13 includes a wireless device that performs short-range wireless communication such as Bluetooth®. In addition, the communication device 13 outputs communication information indicating a communication status to the processing device 11. The communication status includes a call made to another phone device, an incoming call from another phone device, and establishment of communication with another phone device.

The display device 14 displays various images on the above-described display surfaces 41S and 42S under control by the processing device 11. For example, various display panels such as a liquid crystal display panel and an organic EL display panel are suitably used as the display device 14. A display device having the display surface 41S and a display device having the display surface 42S are physically separate display devices. However, in the mobile phone device 100A according to the present embodiment, one image may be displayed across the display surfaces 41S and 42S, or display by the display surface 41S and display by the display surface 42S may be linked with each other to execute one combined process. Therefore, in the present embodiment, the display device having the display surface 41S and the display device having the display surface 42S are treated as one display device 14.

In addition, the display device 14 can switch the display state between the first display state and the second display state in which the display area is larger than the display area in the first display state.

The operating device 15 is a device for inputting information to be used by the mobile phone device 100A. The operating device 15 receives an operation by a user. Specifically, the operating device 15 receives an operation for inputting signs such as numbers and characters, and an operation for selecting an icon to be displayed on the display device 14. For example, a touch panel that detects contact with the display surface of the display device 14 is suitable as the operating device 15. Note that the operating device 15 may include a plurality of operators that can be operated by the user. The first user can input a phone number of another phone device used by the second user by using the operating device 15.

The speaker 16 is a device that converts an electric signal into sound. The processing device 11 includes a DA converter, and an analog signal obtained by converting a digital signal by the DA converter is supplied to the speaker 16. Alternatively, a DA converter may be provided at a previous stage of the speaker 16. In this case, the processing device 11 outputs audio data to the DA converter. When the first user uses the mobile phone device 100A to talk with the second user, the speaker 16 outputs a voice of the second user. In the example illustrated in FIG. 1A, the speaker 16 is provided in an upper portion of the display device 14, but the present disclosure is not limited thereto. For example, a first speaker may be provided in the upper portion of the display device 14, and a second speaker may be provided in a lower portion of the display device 14. When the two speakers are provided, the speaker 16 is a general term for the first speaker and the second speaker.

The microphone 17 is a device that converts sound into an electric signal. The processing device 11 includes an AD converter. The processing device 11 converts an analog audio signal output from the microphone 17 into digital sound data by the AD converter, and uses the sound data for processing. Alternatively, an AD converter may be provided at a subsequent stage of the microphone 17. In this case, the audio signal is converted into audio data by the AD converter. The audio data is supplied to the processing device 11. When the first user uses the mobile phone device 100A to talk with the second user, a voice of the first user is input to the microphone 17.

The opening/closing detection device 18 is a device that detects a display state of the display device 14. Specifically, the opening/closing detection device 18 includes a sensor that detects an angle formed by the display surfaces 41S and 42S, that is, a hinge angle of the hinge 49 and outputs a detection signal having a magnitude corresponding to the hinge angle. When the hinge angle θ indicated by the detection signal is within the range of, for example, 360°<θ<270°, the opening/closing detection device 18 detects that the display state of the display device 14 is the first display state (closed state). When the hinge angle θ indicated by the detection signal is within the range of, for example, 270°<θ<90°, the opening/closing detection device 18 detects that the display state of the display device 14 is the second display state (open state). The opening/closing detection device 18 outputs detection information 18a indicating a result of the detection to the processing device 11.

Figure 4:
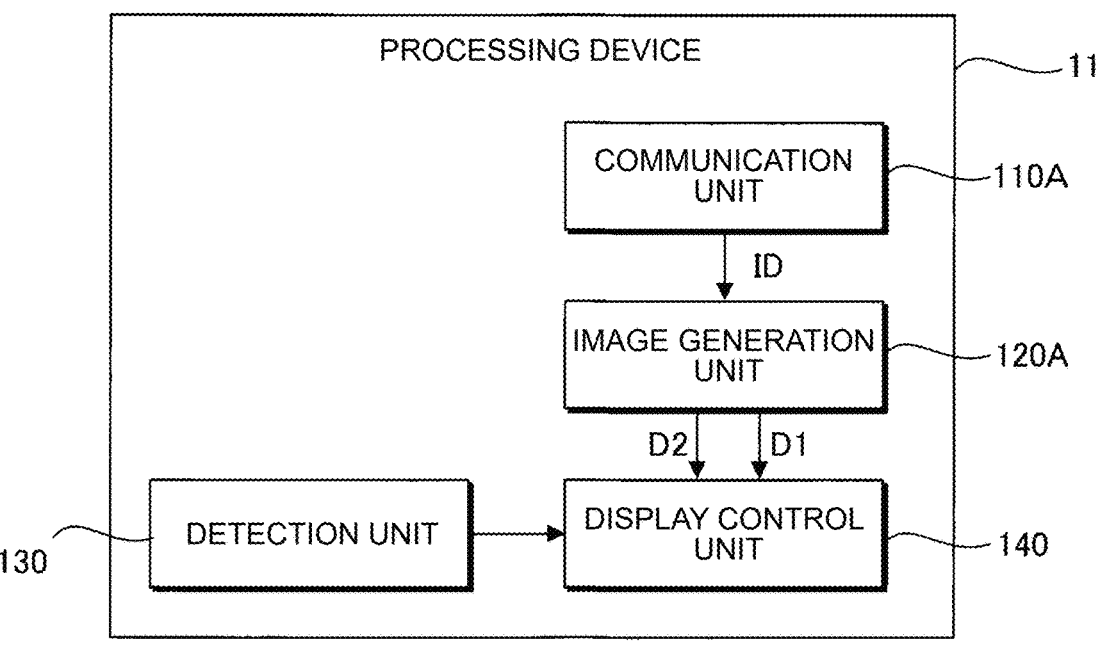
FIG. 4 is a block diagram illustrating a functional configuration of the mobile phone device.

The processing device 11 reads the control program PR stored in the storage device 12 and executes the read control program PR to implement various functions. FIG. 4 is a block diagram illustrating the functions of the processing device 11.

The processing device 11 functions as a communication unit 110A, an image generation unit 120A, a detection unit 130, and a display control unit 140 by executing the control program PR.

The communication unit 110A executes a call between the first user of the mobile phone device 100A and the second user by using the communication device 13, the speaker 16, and the microphone 17. Call modes include a normal call and a hands-free call. The normal call is a mode in which the first user presses the mobile phone device 100A against his/her face to make a call. The hands-free call is a mode in which the first user places the mobile phone device 100A away from his/her face to make a call. When the call mode is the hands-free call, the communication unit 110A increases the loudness of the sound output from the speaker 16 as compared with a case where the call mode is the normal call. Specifically, the communication unit 110A controls the amplitude of an audio signal supplied to the speaker 16 according to the call mode.

Further, the communication unit 110A outputs identification information ID for identifying another phone device used by the second user. Details of the identification information ID will be described later.

The image generation unit 120A generates a first image D1 and a second image D2. When the first user makes a call with the second user, the first image D1 indicates first information including the phone number of another phone device. In a case where the image generation unit 120A generates the first image D1, the image generation unit 120A acquires the identification information ID for identifying another phone device from the communication unit 110A. The identification information ID is, for example, the phone number of another phone device. The identification information ID may be, for example, a name of the second user. Alternatively, the identification information ID includes at least one of the phone number of another phone device and the name of the second user. The identification information ID in the present embodiment includes the phone number of another phone device and the name of the second user. The communication unit 110A identifies the name of the second user by referring to the table TBL based on the phone number of another phone device, and generates the identification information ID including the phone number and the name of the identified second user.

Figure 5:
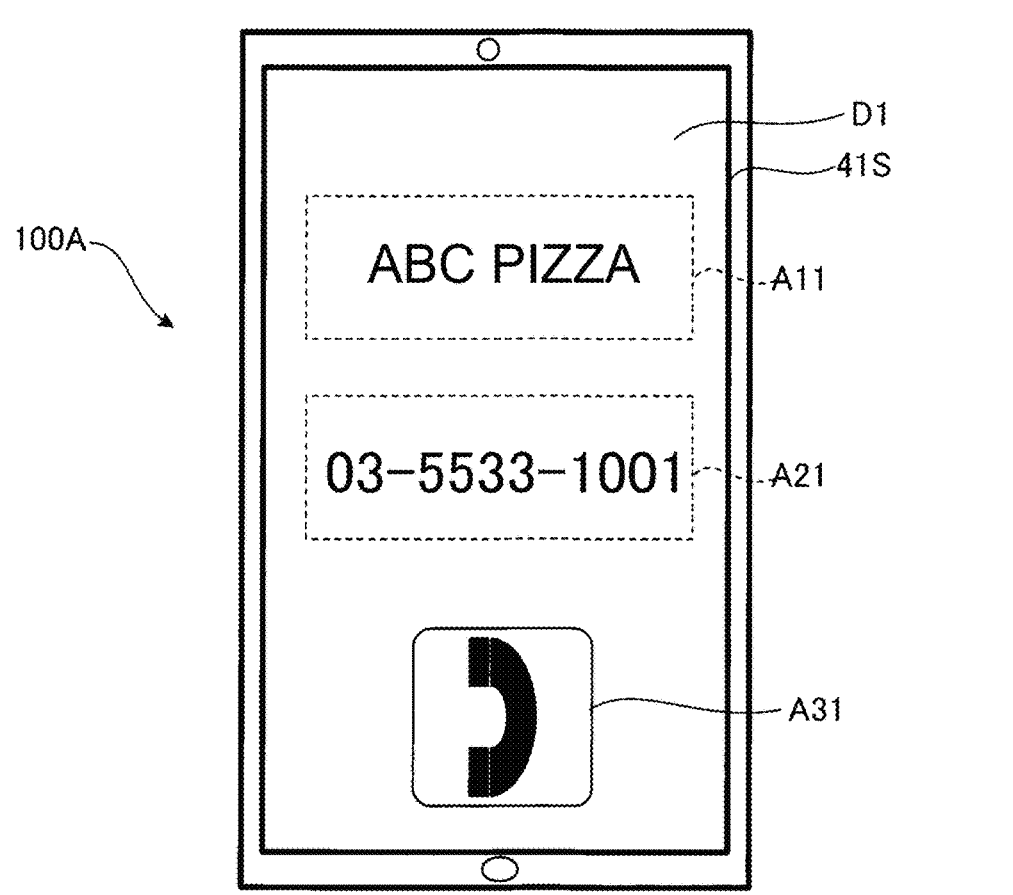
FIG. 5 is an explanatory diagram illustrating an example of a first image displayed on the mobile phone device.

FIG. 5 is a plan view illustrating an example of the first image D1 displayed on the display surface 41S of the display device 14. In the first image D1 illustrated in FIG. 5, an image of text indicating the second user is arranged in a region A11, an image of text of a phone number "03-5533-1001" is arranged in a region A21, and an icon indicating that a call is being made is arranged in a region A31. The first information in this example is that the second user is "ABC pizza", the phone number of another phone device is "03-5533-1001", and a call is in progress.

The second image D2 indicates second information related to the second user including information other than the first information. The image generation unit 120A generates the second image D2 based on the identification information ID. The image generation unit 120A specifies the address of the second user based on, for example, the phone number or the name of the second user. For example, the image generation unit 120A uses a web browser to search for the address based on the phone number or the name of the second user so as to specify the address of the second user. Furthermore, the image generation unit 120A may use a map application to generate an image of a map including the specified address, and may use the image of the map as the second image D2. In this case, the second image D2 may be a map in which the position indicating the address of the second user is the center. By locating the address of the second user at the center of the map in this manner, it is possible to notify the first user of the situation around the address of the second user. In addition, for example, the image generation unit 120A may use a web browser to search for the address based on the phone number or the name of the second user so as to specify a service provided by the second user, generate an image related to the specified service, and set the image as the second image D2.

Figure 6:
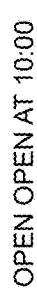
FIG. 6 is an explanatory diagram illustrating an example of a second image displayed on the mobile phone device.

FIG. 6 is a plan view illustrating an example of the second image D2 displayed on the display surfaces 41S and 42S of the display device 14. In the second image D2 illustrated in FIG. 6, an image of a map including the address of the second user is arranged in a region B11, an image indicating a street view of the address of the second user is arranged in a region B21, and an image related to the service of the second user is arranged in a region B31. The second information in this example is the map including the address of the second user, the street view of the address of the second user, and the content of the service provided by the second user. The first user can know the map including the address of "ABC pizza" that is the second user, a menu of "ABC pizza", and the like only by talking on the phone with the second user.

The detection unit 130 illustrated in FIG. 4 detects a switching operation by the first user to switch the display state of the display device 14 from the first display state to the second display state. Specifically, the detection unit 130 detects that the display state of display device 14 is switched from the first display state to the second display state based on the detection information 18*a*.

When the display state of the display device 14 indicated by the detection information 18*a* is the first display state, the display control unit 140 causes the display device 14 to display the first image D1. In this example, when the display state of the display device 14 is the first display state, the display control unit 140 displays the first image D1 on the display surface 41S of the display device 14. For example, the display control unit 140 displays the first image D1 illustrated in FIG. 5 on the display surface 41S of the display device 14.

Furthermore, when the switching operation is detected by the detection unit 130, the display control unit 140 changes the display state of the display device 14 to the second display state and displays the second image D2 on the display device 14. For example, the display control unit 140 displays the second image D2 illustrated in FIG. 6 on the display surfaces 41S and 42S of the display device 14.

When the first user switches the display state of the display device 14 from the first display state to the second display state, the first user rotates the housing 42 illustrated in FIG. 1A in a direction of an arrow Q. In this change of the display state, it is desirable that the second image D2 is immediately displayed on the display device 14 when the display state of the display device 14 becomes the second display state. When the second image D2 can be prepared while the display state of the display device 14 is the first display state, the second image D2 can be displayed on the display device 14 from the start of the second display state.

Therefore, in a case where a call between the first user and the second user is started while the display state of the display device 14 is the first display state, the image generation unit 120A generates the second image D2. Specifically, when communication is established between the mobile phone device 100A and another phone device, the communication unit 110A outputs the identification information ID to the image generation unit 120A. The image generation unit 120A generates the second image ID based on the identification information ID from the timing of acquiring the identification information ID from the communication unit 110A.

In a case where the display state of the display device 14 is the first display state, the mobile phone device 100A is smaller than that in a case where the display state of the display device 14 is the second display state. Therefore, it is common for the first user to talk with the second user according to the mode for a normal call. In a call at a regular place, the first user holds the mobile phone device 100A with one hand, presses the speaker 16 against the ear, brings the microphone 17 close to the mouth, and makes a call. In a case where the display state of the display device 14 is the first display state, the first user recognizes the phone number or the like of another phone device by viewing the first image D1 when there is an incoming call or a call. After confirming the phone number or the like of another phone device, the first user presses the mobile phone device 100A against the face to make a call.

On the other hand, when the display state of the display device 14 becomes the second display state, detailed information regarding the second user is displayed on the display device 14. For this reason, the first user often talks with the second user while viewing the second image D2 displayed on the display device 14. Therefore, when the display state of the display device 14 is switched from the first display state to the second display state during a call, it is desirable to switch to the hands-free call even if the first user does not operate the operating device 15.

Therefore, when the display state of the display device 14 is the second display state at the timing when the switching operation is detected by the detection unit 130, the communication unit 110A of the present embodiment makes a voice of the second user output from the speaker 16 louder than a voice of the second user output from the speaker 16 when the display state of the display device 14 is the first display state. Specifically, the communication unit 110A makes the amplitude of an audio signal to be output to the speaker 16 in the second display state larger than the amplitude of an audio signal to be output to the speaker 16 in the first display state. Note that, in a case where the speaker 16 includes a plurality of speakers, the speaker that outputs a voice of the second user in the first display state may be different from the speaker that outputs a voice of the second user in the second display state. For example, the speaker that outputs a voice of the second user in the first display state may be the first speaker, and the speaker that outputs a voice of the second user in the second display state may be the second speaker. When the speaker that outputs a voice of the second user is changed according to the display state, it is preferable that the voice of the second user is louder in the second display state than in the first display state. By using different speakers, it is possible to selectively use a speaker for a small volume and a speaker for a large volume.

The image generation unit 120A may notify the communication unit 110A that the generation of the second image D2 is completed. When acquiring the notification, the communication unit 110A may cause the speaker 16 to output a predetermined sound that prompt to change the display state of the display device 14 from the first display state to the second display state. By outputting the predetermined sound from the speaker 16, the first user can know that the second image D2 is ready to be displayed. Note that, in a case where the generation of the second image D2 is completed, in order to notify the first user of the completion, the image generation unit 120A may generate an image prompting a change in the display state, and output the generated image to the display control unit 140. The display control unit 140 causes the display device 14 to display the image. Alternatively, a vibrator may be provided in 100A, and the first user may be notified that the generation of the second image D2 is completed by driving the vibrator. In a case where the notification is made by vibration, when the generation of the second image D2 is completed, the image generation unit 120A may output a control signal for driving the vibrator for a predetermined time to the vibrator.

Figure 7:
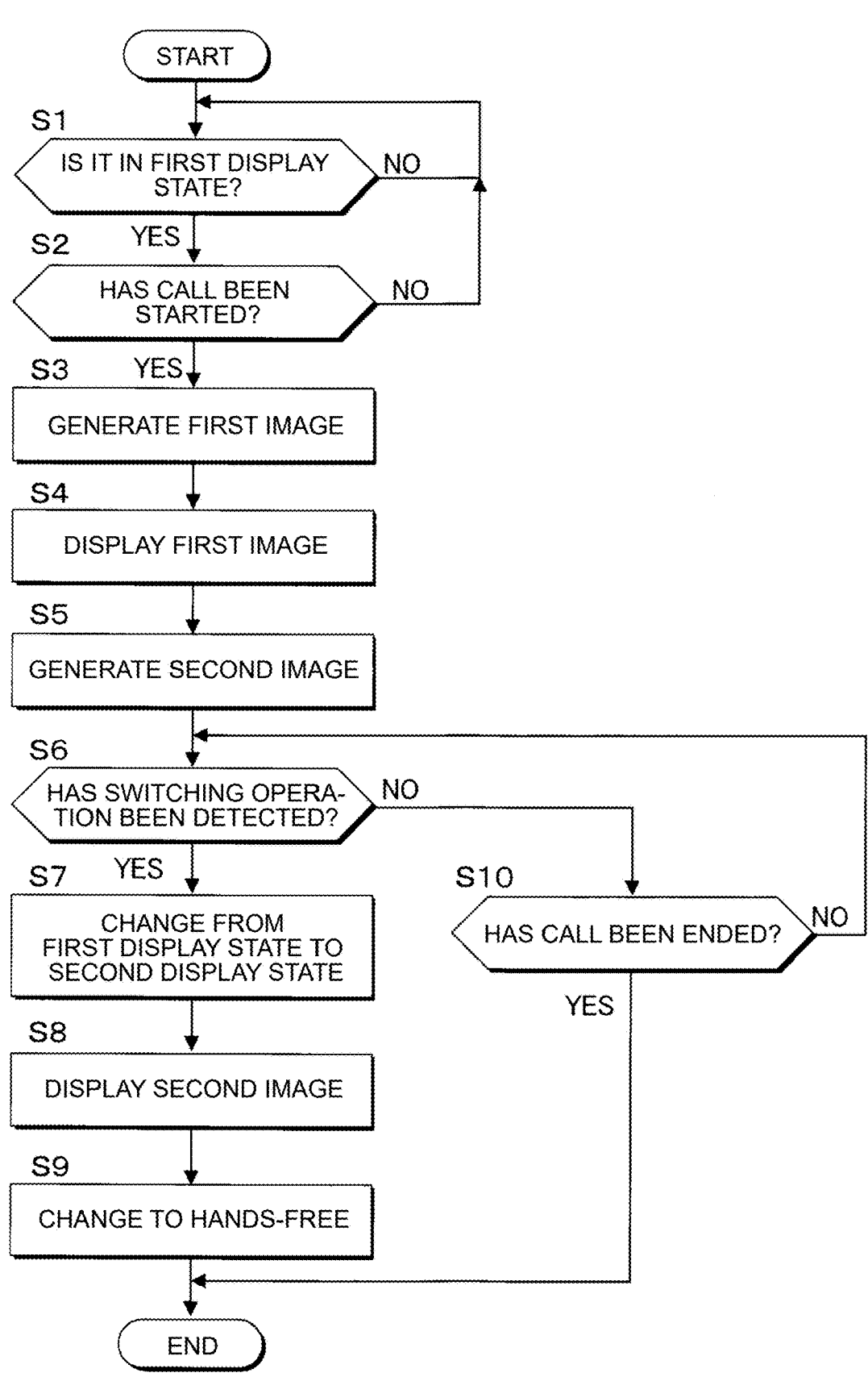
FIG. 7 is a flowchart illustrating an operation of the mobile phone device.

Next, an operation of the mobile phone device 100A according to the first embodiment will be described. FIG. 7 is a flowchart illustrating an operation of the mobile phone device 100A. The processing device 11 determines whether or not the display state of the display device 14 is the first display state based on the detection information 18a (step S1). When the determination result of step S1 is negative, the processing device 11 repeats step S1 until the determination result of step S1 is affirmative. When the determination result of step S1 is affirmative, the processing device 11 determines whether a call between the first user and the second user has been started (step S2). The start of the call means that communication has been established between the mobile phone device 100A and another phone device used by the second user. Specifically, the processing device 11 determines that the call has started based on communication information output from the communication device 13.

In a case where the determination result of step S2 is negative, the processing device 11 returns the processing to step S1. On the other hand, when the determination result of step S2 is affirmative, the processing device 11 generates the first image D1 based on the identification information ID (step S3).

Next, the processing device 11 causes the display device 14 to display the first image D1 (step S4). Since the display state of the display device 14 is the first display state, the first image D1 is displayed on the display surface 41S. Since the first image D1 indicates the first information including the phone number of another phone device, the first user can confirm the phone number of another phone device in a state where the mobile phone device 100A is closed. Since the identification information ID in this example includes the name of the second user, as illustrated in FIG. 5, the first image D1 includes an image "ABC pizza" of the name of the second user located in the region A21 in addition to the image "03-5533-1001" of the phone number located in the region A11.

Next, the processing device 11 generates the second image D2 based on the identification information ID (step S5). The second image D2 indicates the second information including information other than the first information. For example, as illustrated in FIG. 6, in the second image D2, as information other than the phone number "03-5533-1001" and the name "ABC pizza" of the second user, a map including the address of the second user is arranged in the region B11, and an image indicating the content of the service provided by the second user is arranged in the region B31.

Next, the processing device 11 determines whether or not a switching operation by the first user to switch the display state of the display device 14 from the first display state to the second display state has been detected (step S6). Specifically, the processing device 11 determines whether or not the switching operation has been detected based on the detection information 18a.

When the determination result of step S6 is negative, the processing device 11 determines whether the call has been ended based on the communication information (step S10).

In a case where the determination result of step S10 is affirmative, the processing device 11 ends the processing. On the other hand, in a case where the determination result of step S10 is negative, the processing device 11 returns the processing to step S6.

When the determination result of step S6 is affirmative, the processing device 11 changes the display state of the display device 14 from the first display state to the second display state (step S7). Specifically, the processing device 11 changes the display using only the display surface 41S to the display using the display surfaces 41S and 42S.

Next, the processing device 11 changes the call mode from the normal call to the hands-free call (step S9). Specifically, the processing device 11 increases the amplitude of an audio signal to be output to the speaker 16 as compared with the case of the normal call. By changing to the hands-free call, the first user can talk with the second user while viewing the second image D2 displayed on the display surfaces 41S and 42S. Therefore, since the first user can interact with the second user while referring to the information regarding the second user displayed on the large-screen display device 14, it is possible to communicate with the second user well.

The processing device 11 functions as the image generation unit 120A in steps S1, S2, S3, and S5. The processing device 11 functions as the display control unit 140 in steps S4, S7, and S8. The processing device 11 functions as the communication unit 110A in steps S9 and S10. The processing device 11 functions as the detection unit 130 in step S6.

As described above, the mobile phone device 100A according to the first embodiment includes: the display device 14 capable of switching the display state between the first display state and the second display state in which the display area is larger than the display area in the first display state; the communication unit 110A that executes a call between the first user of the mobile phone device 100A and the second user who makes a call using another phone device; the image generation unit 120A that generates the first image D1 indicating the first information including the phone number of another phone device based on the identification information ID for identifying another phone device, and generates the second image D2 indicating the second information related to the second user including information other than the first information based on the identification information ID; the detection unit 130 that detects a switching operation by the first user to switch the display state of the display device 14 from the first display state to the second display state; and the display control unit 140 that causes the display device 14 to display the first image D1 in a case where the display state of the display device 14 is the first display state, and changes the display state of the display device 14 to the second display state and causes the display device 14 to display the second image D2 in a case where the switching operation is detected by the detection unit 130.

According to the mobile phone device 100A, since the second image D2 related to the second user is displayed on the display device 14 in the second display state of the large screen, the first user can know information related to the second user during a call. In this case, the first user does not need to perform any input operation on the mobile phone device 100A in order to display the second image D2 on the display device 14. Therefore, operability and convenience of the mobile phone device 100A are improved.

The mobile phone device 100A includes the speaker 16 that outputs a voice of the second user and the communication unit 110A. When the switching operation is detected by the detection unit 130, the communication unit 110A makes a voice of the second user output from the speaker 16 louder than a voice of the second user output from the speaker 16 when the display state of the display device 14 is the first display state.

When the display state of the display device 14 is switched from the first display state to the second display state during a call in the normal call, it is necessary to change the call model to the hands-free call. According to the mobile phone device 100A, in a case where the switching operation is detected by the detection unit 130, the call is changed to the hands-free call, so that the first user does not need to perform any input operation on the mobile phone device 100A. Therefore, operability and convenience of the mobile phone device 100A are improved. In addition, when the display state of the display device 14 is switched from the first display state to the second display state and then is switched again to the first display state during a call, the communication unit 110A may change the call from the hands-free call to the normal call. This is because, in a case where the first user switches to the first display state again, it is considered that the first user intends a normal call by a one-hand operation.

Second Embodiment

The mobile phone device 100A according to the first embodiment described above generates the second image D2 based on the identification information ID. A mobile phone device 100B according to a second embodiment is configured similarly to the mobile phone device 100A according to the first embodiment except that the second image D2 is generated based on the identification information ID and call information X indicating the content of a call. Hereinafter, differences between the mobile phone device 100B according to the second embodiment and the mobile phone device 100A according to the first embodiment will be described.

Figure 8:
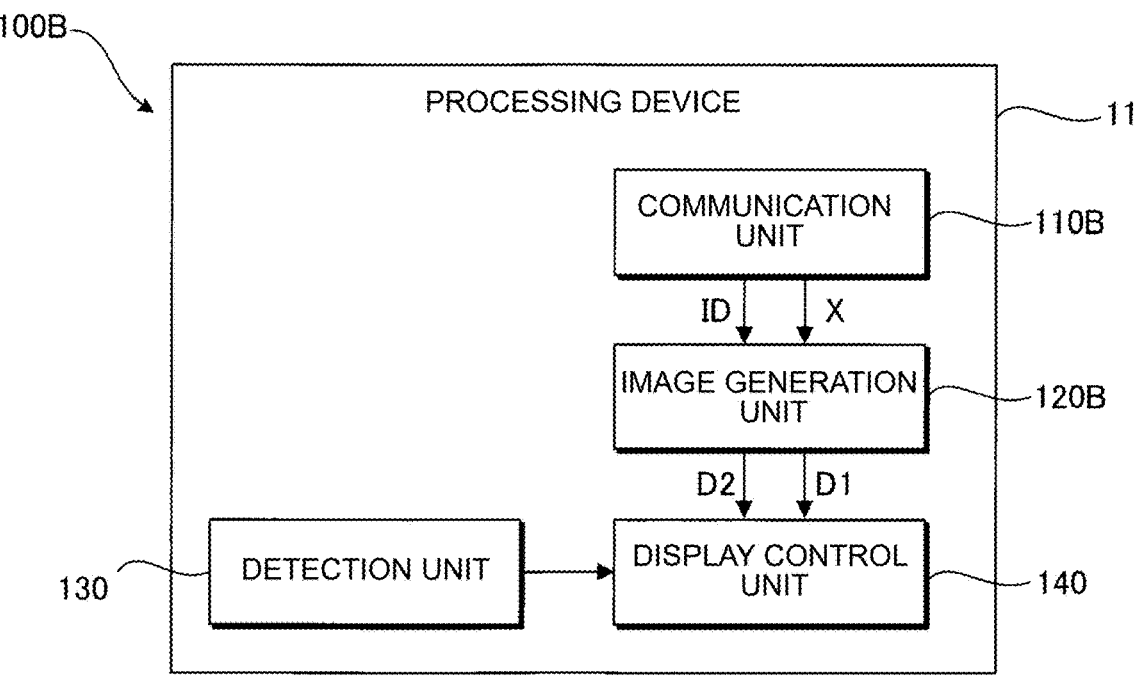
FIG. 8 is a block diagram illustrating a functional configuration of a mobile phone device according to a second embodiment of the present disclosure.

FIG. 8 is a block diagram illustrating functions implemented by the processing device 11 of the mobile phone device 100B executing the control program PR. By executing the control program PR stored in the storage device 12, the processing device 11 of the mobile phone device 100B functions as a communication unit 110B instead of the communication unit 110A illustrated in FIG. 4, and functions as an image generation unit 120B instead of the image generation unit 120A illustrated in FIG. 4.

The communication unit 110B is different from the communication unit 110A that does not output the call information X to the image generation unit 120A in that the identification information ID and the call information X are output to the image generation unit 120B.

The image generation unit 120B generates the second image D2 based on the identification information ID and the call information X output from the communication unit 110B. The call information X indicates the content of a call when the display state of display device 14 is the first display state. Specifically, the image generation unit 120B specifies a keyword included in the call based on the call information X, and generates the second image D2 based on the specified keyword and the identification information ID. The keyword specifying method may be, for example, one or more words included in the utterance of the first user and included in the utterance of the second user. Alternatively, among a plurality of words included in the utterance of the first user and the utterance of the second user, a word that is used most frequently is the keyword.

Figure 9:
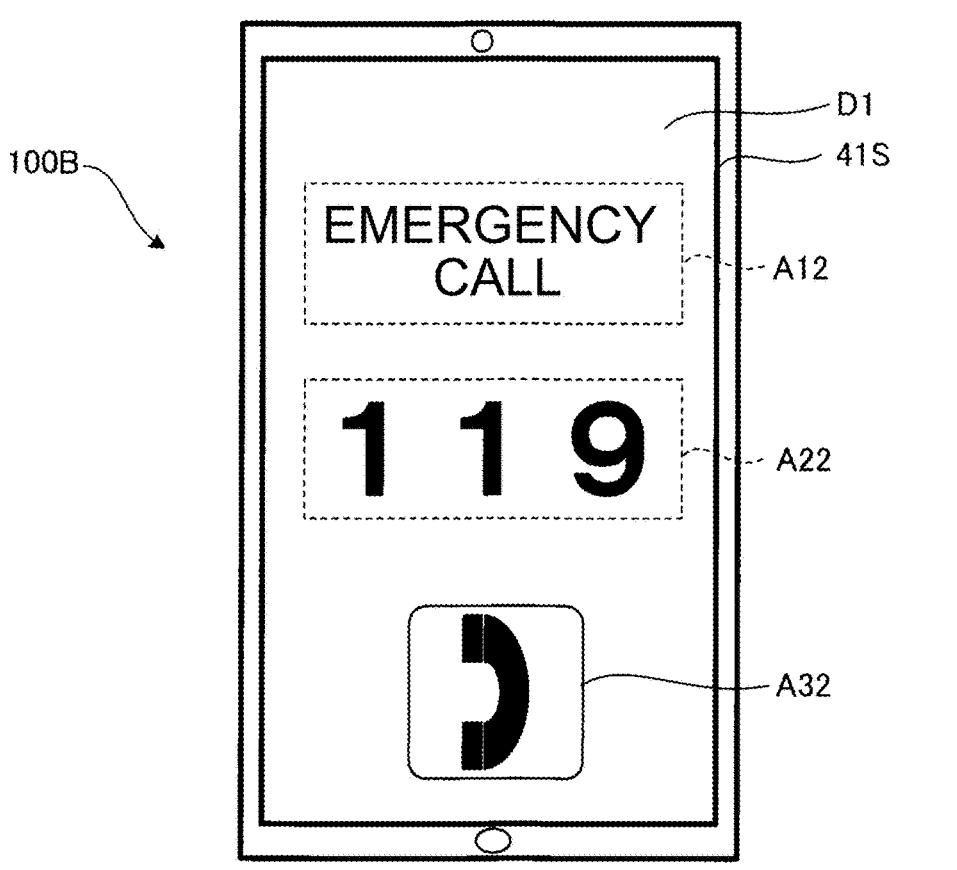
FIG. 9 is an explanatory diagram illustrating an example of a first image displayed on the mobile phone device.

For example, it is assumed that the first user talks with a doctor who is the second user via an emergency call. In addition, it is assumed that the first user needs to attempt to resuscitate the husband using an AED. FIG. 9 is a plan view illustrating an example of the first image D1 displayed on the display surface 41S of the display device 14. In the first image D1 illustrated in FIG. 9, an image of text indicating the emergency call is arranged in a region A12, an image of text of the phone number "119" is arranged in a region A22, and an icon indicating that a call is being made is arranged in a region A32. The first information in this example is that the call is an emergency call, the phone number of another phone device is "119", and a call is in progress.

In addition, it is assumed that the following call is made while the display state of the display device 14 is the first display state.

> First user: "My husband is down. He is not breathing."
> Second user: "Is there an AED nearby?"
> First user: "I have an AED at hand, but I don't know how to use it."
> Second user: "How to use an AED is simple. I will explain."

In this call, the words included in the utterance of the first user and included in the utterance of the second user are "AED" and "how to use". Therefore, the image generation unit 120B specifies "AED" and "how to use" as keywords. In addition, the image generation unit 120B specifies that the second user is compatible with a video phone based on the phone number "119" indicated by the identification information ID. Further, the image generation unit 120B generates an image related to how to use the AED as a part of the second image D2 by searching based on "AED" and "how to use" using a web browser, for example. Furthermore, the image generation unit 120B generates an image of the doctor who is the second user as a part of the second image D2. The image generation unit 120B generates an image related to a resuscitation method using an AED as a part of the second image D2.

Figure 10:
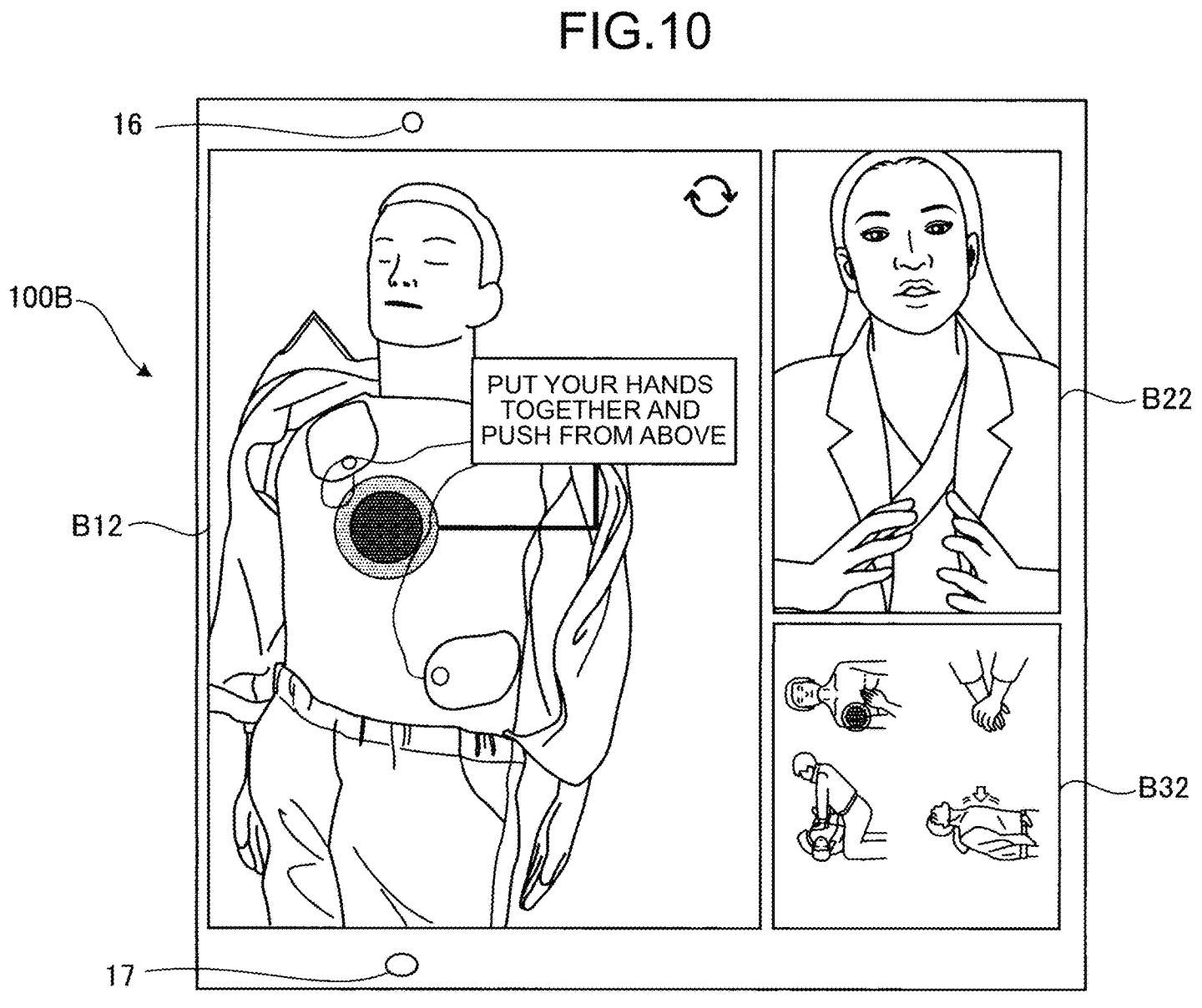

FIG. 10 is a plan view illustrating an example of the second image D2 displayed on the display surfaces 41S and 42S of the display device 14. In the second image D2 illustrated in FIG. 10, an image regarding how to use the AED is arranged in a region B12, an image of the doctor who is the second user is arranged in a region B22, and an image regarding the resuscitation method using the AED is arranged in a region B32. The second information in this example is how to use the AED, the appearance of the second user, and the resuscitation method using the AED.

Figure 11:
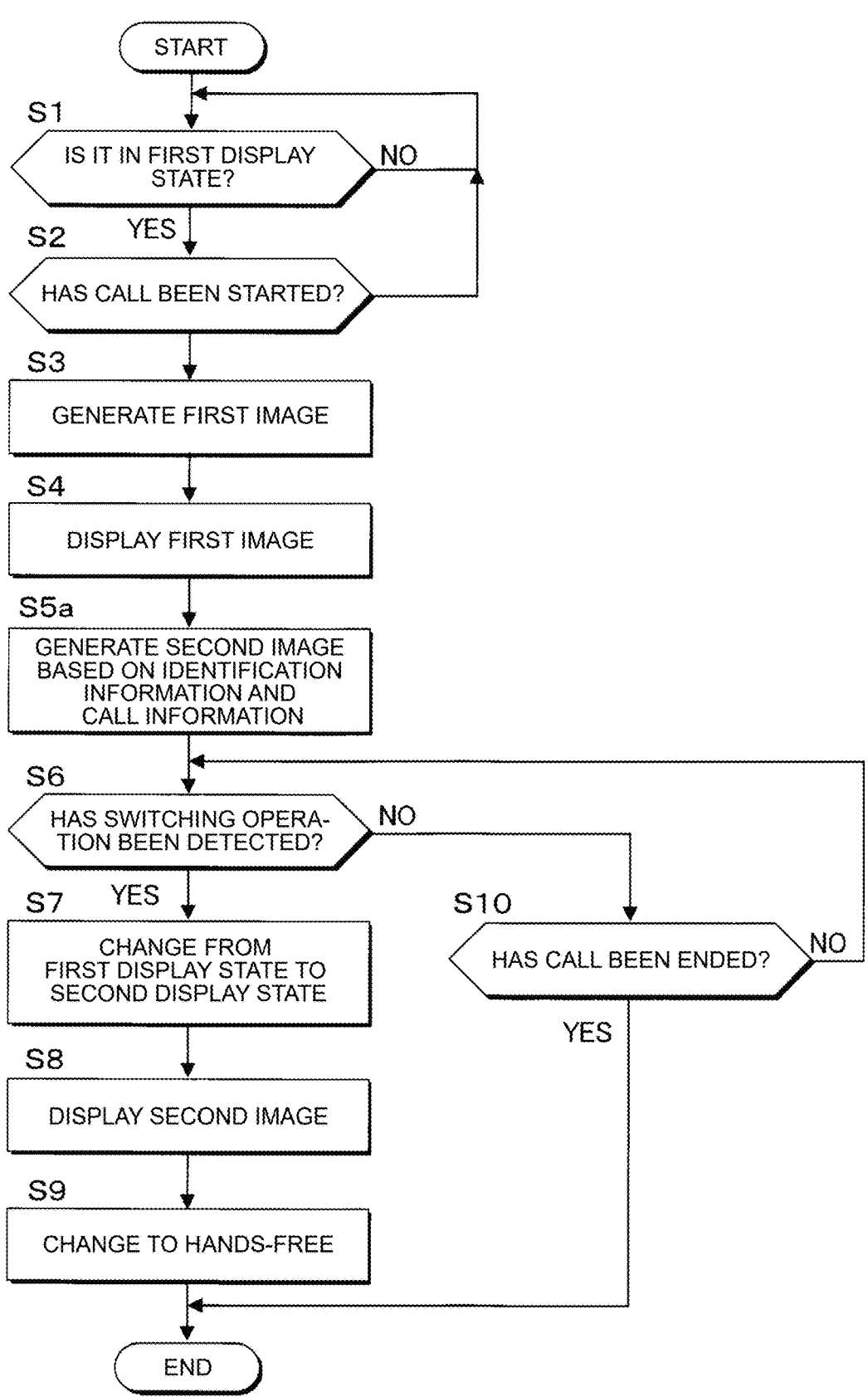
FIG. 11 is a flowchart illustrating an operation of the mobile phone device.

Next, an operation of the mobile phone device 100B according to the second embodiment will be described. FIG. 11 is a flowchart illustrating an operation of the mobile phone device 100B according to the second embodiment. The operation of the mobile phone device 100A according to the second embodiment is similar to the operation of the mobile phone device 100A according to the first embodiment except that step S5*a* is adopted instead of step S5 illustrated in FIG. 7.

In step S5*a*, the processing device 11 generates the second image D2 based on the identification information ID and the call information X when the display state of the display device 14 is the first display state. The processing device 11 functions as the image generation unit 120B in step S5*a*.

As described above, the mobile phone device 100B according to the second embodiment generates the second image D2 to be displayed on the display device 14 based on the identification information ID and the call information X when the display state of the display device 14 is the second display state. Therefore, the mobile phone device 100B can generate the second image D2 in consideration of the content of the call in the first display state. Therefore, useful information is provided to the first user as compared with a case where the second image D2 is generated based on the identification information ID without consideration of the call information X. As a result, the convenience of the mobile phone device 100B is improved.

Note that information displayed in the region B12 and the region B32 may be transmitted from the mobile phone device 100 to the terminal device of the second user. For example, when the second user is a doctor, the information is displayed on the terminal device, so that the doctor can confirm the information displayed on the mobile phone device 100 of the first user. Therefore, the doctor can explain the coping method and the like to the first user more easily by making a call while grasping the obtained information.

Third Embodiment

Figure 12A:
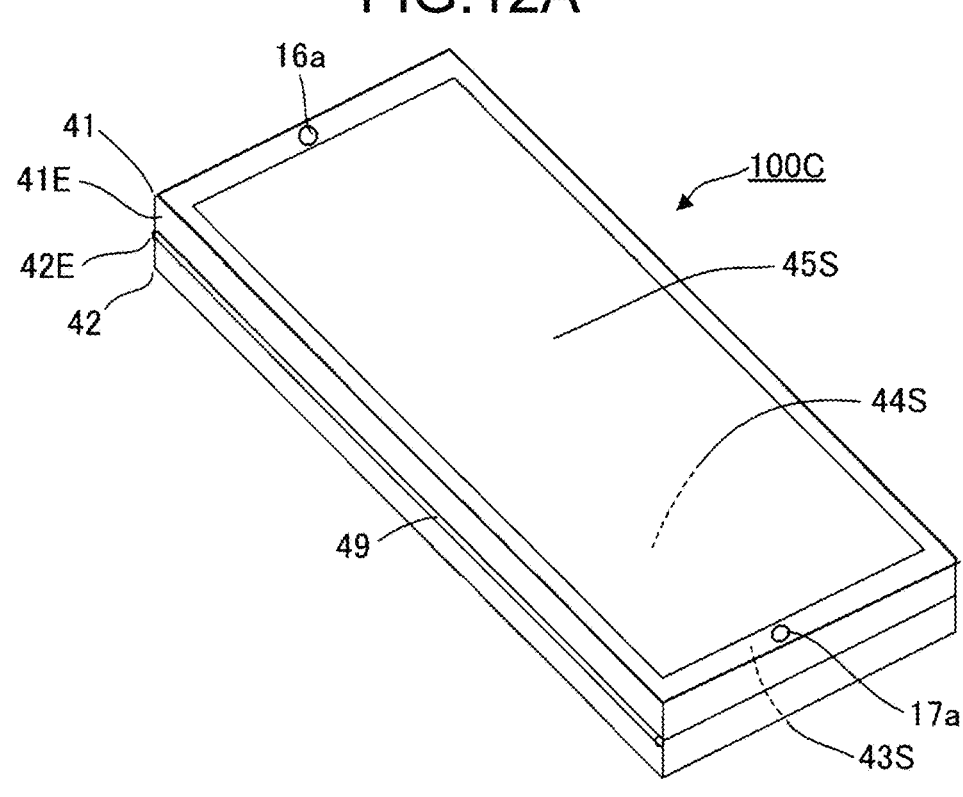
FIG. 12A is a perspective view illustrating an appearance of a mobile phone device according to a third embodiment of the present disclosure in a first display state.
Figure 12B:
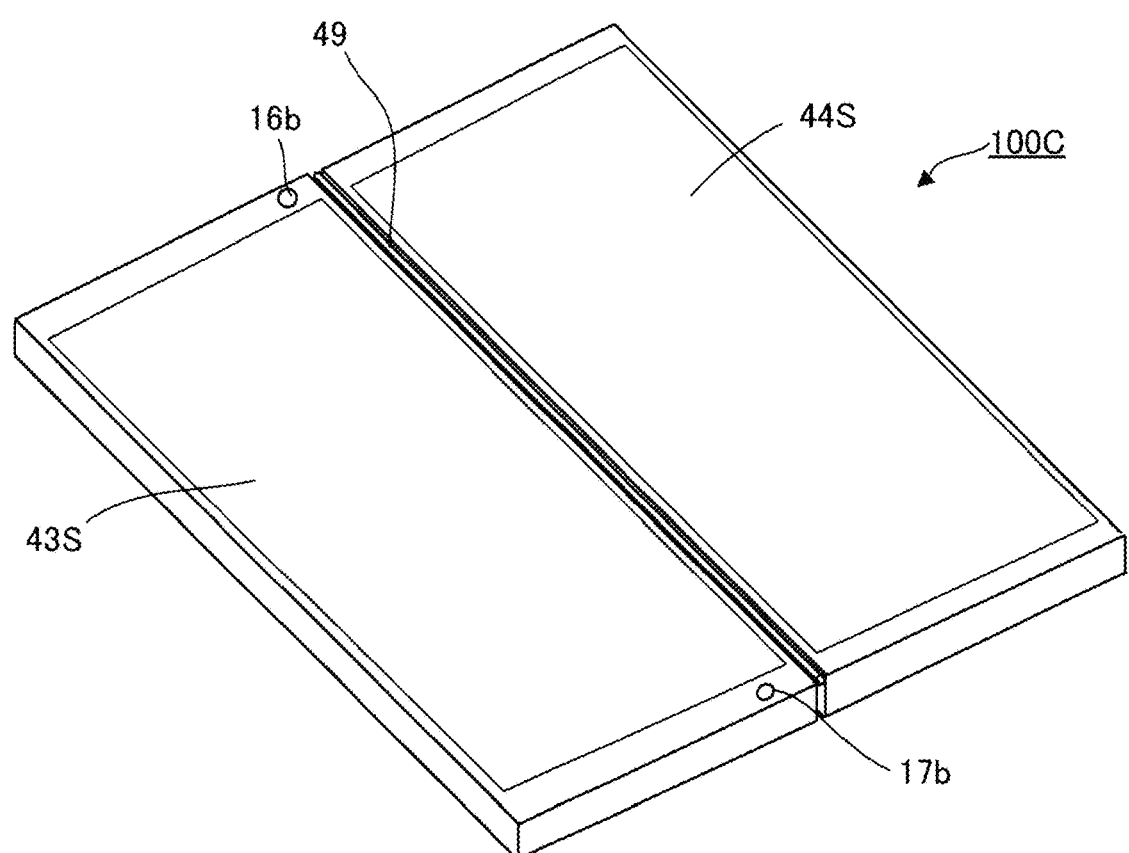
FIG. 12B is a perspective view illustrating an appearance of the mobile phone device in a second display state.

FIGS. 12A and 12B are perspective views illustrating an appearance of a mobile phone device 100C according to a third embodiment of the present disclosure. The mobile phone device 100C according to the present embodiment is different from the mobile phone device 100A according to the first embodiment in the detailed configuration of the display device 14. In addition, the mobile phone device 100C is different from the mobile phone device 100A in that a communication unit 110C is used instead of the communication unit 110A.

The mobile phone device 100C includes housings 41 and 42 and a hinge 49 as in the first embodiment. In the first embodiment, the mobile phone device 100A has the two display surfaces 41S and 42S. On the other hand, the mobile phone device 100C according to the present embodiment has three rectangular display surfaces 43S, 44S, and 45S. Specifically, the housing 41 has the display surfaces 45S and 44S on its front and back two surfaces, respectively, and the housing 42 has the display surface 44S on one of its front and back two surfaces. The hinge 49 connects a long side of the rectangular end surface 41E of the housing 41 facing the display surface 43S and a long side of the rectangular end surface 42E of the housing 42 facing the display surface 44S.

In the present embodiment, the hinge angle formed by the display surfaces 43S and 44S changes as the hinge 49 rotates. In the present embodiment, by setting the hinge angle to 0 degrees, the user can set the display state of the display device 14 of the mobile phone device 100C to the first display state in which the display surfaces 43S and 44S face each other and display is performed only on the display surface 45S facing outward as illustrated in FIG. 12A. In the present embodiment, by setting the hinge angle to 180 degrees, the first user can set the display state of the display device 14 of the mobile phone device 100C to the second display state in which the display surfaces 41S and 42S face outward and display is performed on both the display surfaces 41S and 42S as illustrated in FIG. 12B. Here, the total display area of the display surfaces 43S and 44S is larger than the display area of the display surface 45S. Therefore, the second display state is a display state in which the display area is larger than that in the first display state.

A first speaker 16a and a first microphone 17a that are used when the display state of the display device 14 is the first display state are disposed on a surface of the housing 41 on which the display surface 45S is located. A second speaker 16b and a second microphone 17b that are used when the display state of the display device 14 is the second display state are disposed on a surface of the housing 41 on which the display surface 43S is located.

Figure 13:
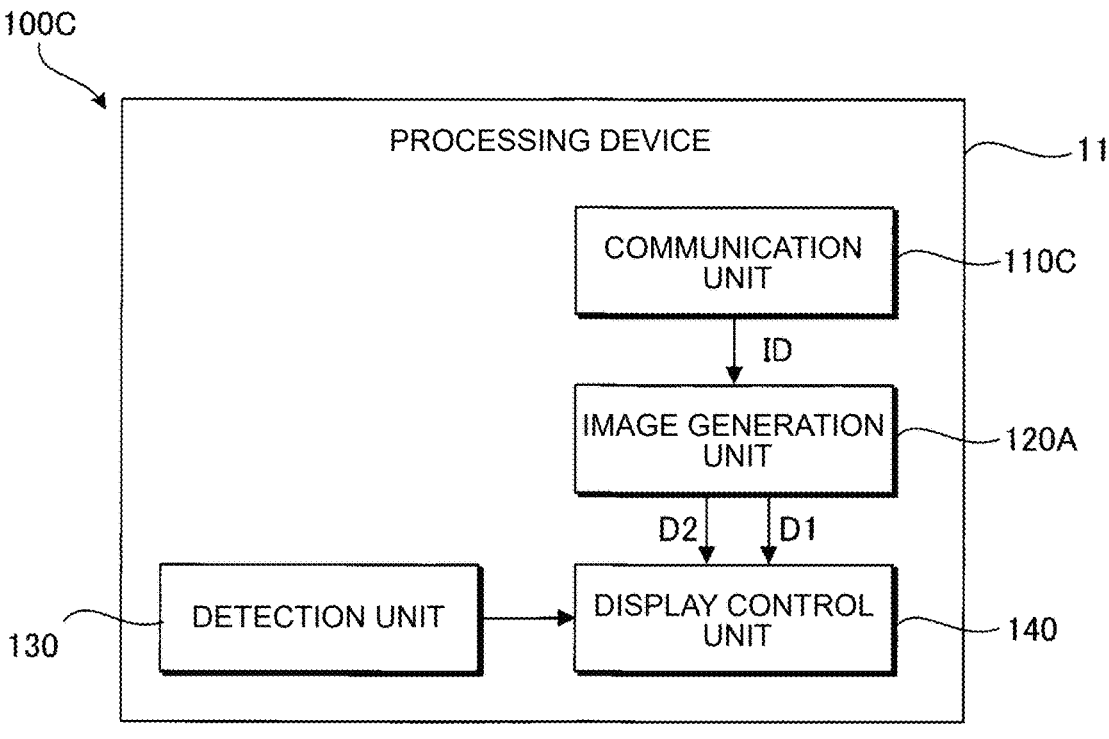
FIG. 13 is a block diagram illustrating a functional configuration of the mobile phone device.

FIG. 13 is a block diagram illustrating functions implemented by the processing device 11 of the mobile phone device 100C executing the control program PR. By executing the control program PR stored in the storage device 12, the processing device 11 of the mobile phone device 100C functions as the communication unit 110C instead of the communication unit 110A illustrated in FIG. 4.

When the display state of the display device 14 becomes the first display state, the communication unit 110C converts a voice of the first user into an electric signal using the first microphone 17a, and outputs a voice of the second user from the first speaker 16a.

When the display state of the display device 14 becomes the second display state, the communication unit 110C converts a voice of the first user into an electric signal using the second microphone 17b, and outputs a voice of the second user from the second speaker 16b.

Therefore, when the display state of the display device 14 is the second display state at the timing when the switching operation is detected by the detection unit 130, the communication unit 110C makes a voice of the second user output from the second speaker 16b louder than a voice of the second user output from the first speaker 16a when the display state of the display device 14 is the first display state. As a result, even if the first user does not operate the operating device 15, the normal call is switched to the hands-free call.

The mobile phone device 100C according to the third embodiment has the same effect as the mobile phone device 100A according to the first embodiment. In the third embodiment, the display surfaces 43S and 44S face each other in the first display state. Therefore, since a finger or the like of the first user does not touch the display surfaces 43S and 44S, for example, in the first display state, there is an advantage that processing such as disabling the operation on touch panels provided on the display surfaces 43S and 44S is not required.

Fourth Embodiment

An appearance of a mobile phone device 100D according to a fourth embodiment of the present disclosure is similar to that of the mobile phone device 100C according to the third embodiment described with reference to FIGS. 12A and 12B. Functions of the mobile phone device 100D are the same as the functions of the mobile phone device 100C except that a communication unit 110D is used instead of the communication unit 110C and the image generation unit 120B is used instead of the image generation unit 120A.

Figure 14:
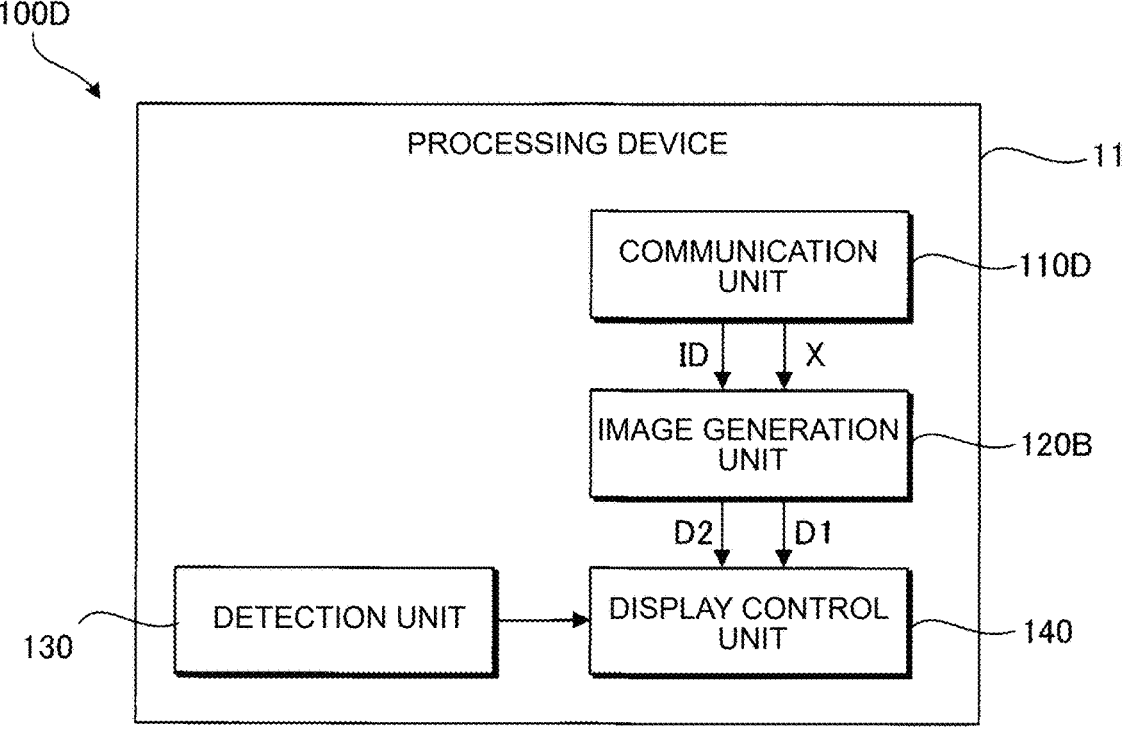
FIG. 14 is a block diagram illustrating a functional configuration of a mobile phone device according to a fourth embodiment of the present disclosure.

FIG. 14 is a block diagram illustrating functions implemented by the processing device 11 executing the control program PR. By executing the control program PR stored in the storage device 12, the processing device 11 of the third embodiment functions as the communication unit 110C instead of the communication unit 110A illustrated in FIG. 4.

The mobile phone device 100D includes the image generation unit 120B described in the second embodiment. Therefore, the mobile phone device 100D generates the second image D2 based on the identification information ID and the call information X. Since this point is the same as that of the second embodiment, the mobile phone device 100D has the same effect as that of the mobile phone device 100B according to the second embodiment. In the fourth embodiment, the display surfaces 43S and 44S face each other in the first display state. Therefore, since a finger or the like of the first user does not touch the display surfaces 43S and 44S, for example, in the first display state, there is an advantage that processing such as disabling the operation on touch panels provided on the display surfaces 43S and 44S is not required.

Modifications

The present disclosure is not limited to the above-described embodiments. Specific modifications are exemplified below. Two or more aspects arbitrarily selected from the following examples may be combined.

(1) The image generation units 120A and 120B generate the second image D2 when the call is started, but the present disclosure is not limited thereto. In short, the image generation units 120A and 120B may generate the second image D2 before the display state of the display device 14 is switched from the first display state to the second display state. For example, in a case where the communication unit 110A makes a call to another phone device or receives an incoming call from another phone device while the display state of the display device 14 is the first display state, the image generation units 120A and 120B may generate the second image D2. Specifically, the communication units 110A and 10B output the identification information ID to the image generation unit 120A in response to a call made to another phone device. Further, the communication units 110A and 110B output the identification information ID to the image generation units 120A and 120B in response to an incoming call from another phone device. The image generation units 120A and 120B may generate the second image D2 based on the identification information ID from the timing of acquiring the identification information ID from one of the communication units 110A and 110B.

(2) In the third embodiment and the fourth embodiment, the display is performed on the separate display surfaces 43S and 44S in the second display state. However, the display device 14 may be provided with one continuous display surface extending over the housings 41 and 42 and having a larger display area than the display surface 45S, and display may be performed on the display surface in the second display state.

(3) In each of the above embodiments, the storage device 12 is a recording medium that is readable by the processing device 11, and examples thereof include the ROM and the RAM. However, the storage device 12 is a flexible disk, a magneto-optical disc (for example, a compact disc, a digital versatile disc, or a Blu-ray (registered trademark) disc), a smart card, a flash memory device (for example, a card, a stick, or a key drive), a CD-ROM (Compact Disc-ROM), a register, a removable disk, a hard disk, a floppy (registered trademark) disk, a magnetic strip, a database, a server, or another appropriate storage medium. In addition, the program may be transmitted from a network via a telecommunication line. In addition, the program may be transmitted from a communication network via a telecommunication line. Note that a base station may include an input device such as an input key and an output device such as a display.

(4) Each of the above embodiments may be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), Wi-Fi® (IEEE 802.11), WiMAX® (IEEE 802.16), IEEE 802.20, Ultra-WideBand (UWB), Bluetooth®, another appropriate system, and/or a next-generation system extended based on these systems.

(5) In each of the above embodiments, the described information, signals, and the like may be represented using any of a variety of different technologies. For example, data, instructions, commands, information, signals, bits, symbols, chips, and the like that may be mentioned throughout the above description may be represented by voltages, currents, electromagnetic waves, magnetic fields or particles, optical fields or photons, or any combination thereof. Note that the terms described in the present specification and/or terms necessary for understanding the present specification may be replaced with terms having the same or similar meanings.

(6) In each of the above embodiments, the input/output information and the like may be stored in a specific location (for example, a memory) or may be managed in a management table. The input/output information and the like can be overwritten, updated, or additionally written. The output information and the like may be deleted. The input information and the like may be transmitted to another device.

(7) In each of the above embodiments, the determination may be performed by a value represented by one bit (0 or 1), may be performed by a true/false value (Boolean: true or false), or may be performed by comparison of numerical values (for example, comparison with a predetermined value).

(8) In the flowcharts exemplified in the above embodiments, the order of the steps may be changed. That is, the order of each processing in the preferred aspect of the present disclosure is not limited to a specific order.

(9) Each function disclosed in the above embodiments is implemented by an arbitrary combination of hardware and software. In addition, each function may be implemented by a single device, or may be implemented by two or more devices configured separately from each other.

(10) The program exemplified in each of the above embodiments should be interpreted broadly to mean an instruction, an instruction set, a code, a code segment, a program code, a subprogram, a software module, an application, a software application, a software package, a routine, a subroutine, an object, an executable file, an execution thread, a procedure, a function, or the like, whether referred to as software, firmware, middleware, microcode, or a hardware description language, or referred to as another name. In addition, software, instructions, and the like may be transmitted and received via a transmission medium. For example, when software is transmitted from a website, a server, or another remote source by using wired technologies such as a coaxial cable, an optical fiber cable, a twisted pair, and a digital subscriber line (DSL) and/or wireless technologies such as an infrared ray, radio, and a microwave, these wired and/or wireless technologies are included in the definition of the transmission medium.

(11) In each of the above embodiments, the mobile phone device 100A, 100B, 100C, or 100D may be a mobile station. The mobile station may also be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable term.

(12) In each of the above embodiments, the term "connected" or any variation thereof means any direct or indirect connection or coupling between two or more elements, and may include the presence of one or more intermediate elements between two elements that are "connected" to each other. The connection between the elements may be physical, logical, or a combination thereof. As used herein, two elements may be considered to be "connected" to one another by using one or more wires, a cable, and/or a printed electrical connection, and as some non-limiting and non-exhaustive examples, by using electromagnetic energy such as electromagnetic energy having wavelengths in the radio frequency region, the microwave region, and the light (both visible and invisible) region.

(13) In each of the above embodiments, the description "based on" does not mean "based only on" unless otherwise specified. In other words, the description "based on" means both "based only on" and "based at least on."

(14) To the extent that "including," "comprising," and variations thereof are used in the specification or claims, these terms are intended to be inclusive in a manner similar to the term "comprising." Furthermore, the term "or" used in the present specification or claims is not intended to be an exclusive OR.

(15) Throughout this application, if articles are added by translation, such as a, an, and the in English, these articles include a plurality unless the context clearly dictates otherwise.

(16) It will be apparent to those skilled in the art that the invention is not limited to the embodiments described herein. The present invention can be implemented as modifications and variations without departing from the spirit and scope of the present invention defined based on the description of the claims. Accordingly, the description herein is for the purpose of illustrative description and has no restrictive meaning to the invention. In addition, a plurality of aspects selected from the aspects exemplified in the present specification may be combined.

Note that the effects described in the present specification are merely examples and are not limited, and other effects may be provided.

Note that the present technology can also include the following configurations.

(1)

A mobile phone device, comprising:

a display device capable of switching a display state between a first display state and a second display state in which a display area is larger than a display area in the first display state;

a communication unit that executes a call between a first user of the mobile phone device and a second user who makes a call using another phone device;

an image generation unit that generates a first image indicating first information including a phone number of the another phone device based on identification information for identifying the another phone device, and generates a second image indicating second information related to the second user including information other than the first information based on the identification information;

a detection unit that detects a switching operation by the first user to switch the display state of the display device from the first display state to the second display state; and a display control unit that causes the display device to display the first image in a case where the display state of the display device is the first display state, and changes the display state of the display device to the second display state and causes the display device to display the second image in a case where the switching operation is detected by the detection unit.

(2)

The mobile phone device according to (1), wherein the image generation unit generates the second image when the communication unit makes a call to the another phone device or when the communication unit receives an incoming call from the another phone device while the display state of the display device is the first display state.

(3)

The mobile phone device according to (1), wherein the image generation unit generates the second image based on the identification information and call information indicating contents of the call in a case where the display state of the display device is the first display state.

(4)

The mobile phone device according to any one of (1) to (3), wherein the identification information includes at least one of a phone number of the another phone device and a name of the second user.

(5)

The mobile phone device according to (4), wherein the second image is an image of a map including an address of the second user.

(6)

The mobile phone device according to (4), wherein the second image is an image related to a service provided by the second user.

(7)

The mobile phone device according to any one of (1) to (6), further comprising a speaker that outputs a voice of the second user, wherein in a case where the switching operation is detected by the detection unit, the communication unit makes a voice of the second user output from the speaker louder than a voice of the second user output from the speaker in a case where the display state of the display device is the first display state.

(8)

The mobile phone device according to any one of (1) to (6), further comprising a first speaker and a second speaker that output a voice of the second user, wherein the communication unit outputs a voice of the second user from the first speaker in the first display state, and in a case where the switching operation is detected by the detection unit, makes a voice of the second user output from the second speaker when the display state of the display device is the second display state louder than a voice of the second user output from the first speaker when the display state of the display device is the first display state.

REFERENCE SIGNS LIST

16 SPEAKER
16a FIRST SPEAKER
16b SECOND SPEAKER
100A, 100B, 100C, 100D MOBILE PHONE DEVICE
110A, 110B, 110C, 110D COMMUNICATION UNIT
120A, 120B IMAGE GENERATION UNIT

130 DETECTION UNIT
140 DISPLAY CONTROL UNIT
D1 FIRST IMAGE
D2 SECOND IMAGE
X CALL INFORMATION

The invention claimed is:

1. A mobile phone device, comprising:
a display capable of switching a display state between a first display state and a second display state in which a display area is larger than a display area in the first display state;
a communication circuit configured to execute a call between a first user of the mobile phone device and a second user who makes a call using another phone device;
an image generation circuit configured to generate a first image indicating first information including a phone number of the another phone device based on identification information for identifying the another phone device, and generates a second image indicating second information related to the second user including information other than the first information based on the identification information;
a detection circuit configured to detect a switch of the display state of the display from the first display state to the second display state, while the call is being executed by the communication circuit; and
a display control circuit configured to, while the call is being executed by the communication circuit, cause the display to display the first image in a case where the display state of the display is the first display state, and in response to detection of the switch by the detection circuit, change the display state of the display to the second display state and cause the display to display the second image, wherein
the image generation circuit is configured to generate the second image based on the identification information and call information indicating spoken words of the call in a case where the display state of the display is the first display state.

2. The mobile phone device according to claim 1, wherein the image generation circuit is configured to generate the second image when the communication circuit makes a call to the another phone device or when the communication circuit receives an incoming call from the another phone device while the display state of the display is the first display state.

3. The mobile phone device according to claim 1, wherein the identification information includes at least one of a phone number of the another phone device and a name of the second user.

4. The mobile phone device according to claim 3, wherein the second image is an image related to a service provided by the second user.

5. The mobile phone device according to claim 3, wherein the second image is an image of a map including an address of the second user.

6. The mobile phone device according to claim 5, wherein the image of the map is generated with a position corresponding to the address of the second user located at a center of the map.

7. The mobile phone device according to claim 1, further comprising
a speaker that outputs a voice of the second user, wherein in a case where the switch is detected by the detection circuit, the communication circuit is configured to make make a voice of the second user output from the speaker louder than a voice of the second user output from the speaker in a case where the display state of the display is the first display state.

8. The mobile phone device according to claim 1, further comprising
a first speaker and a second speaker that output a voice of the second user, wherein
the communication circuit is configured to output
a voice of the second user from the first speaker in the first display state, and
in a case where the switch is detected by the detection circuit, make a voice of the second user output from the second speaker when the display state of the display is the second display state louder than a voice of the second user output from the first speaker when the display state of the display is the first display state.

9. The mobile phone device according to claim 8, wherein the first speaker is provided on a surface of the mobile phone device that is external in the first display state, and the second speaker is provided on a surface that is internal in the first display state and exposed in the second display state.

10. The mobile phone device according to claim 1, wherein the image generation circuit is configured to use a web browser to search for information used to generate the second image.

11. The mobile phone device according to claim 1, wherein the image generation circuit is configured to use a map application to generate the second image.

12. The mobile phone device according to claim 1, wherein the mobile phone device includes a first housing and a second housing connected by a hinge, and wherein the detection circuit is configured to detect a hinge angle of the hinge to determine the display state.

13. The mobile phone device according to claim 1, wherein the image generation circuit is configured to specify one or more keywords from the spoken words of the call and generate the second image based on the one or more keywords.

14. The mobile phone device according to claim 13, wherein the one or more keywords are specified by identifying words that are included in both an utterance of the first user and an utterance of the second user.

15. The mobile phone device according to claim 1, further comprising a speaker, wherein the communication circuit is configured to cause the speaker to output a predetermined sound after the image generation circuit generates the second image, the predetermined sound for prompting the first user to switch the display state from the first display state to the second display state.

16. The mobile phone device according to claim 1, wherein the display control circuit is configured to cause the display to display a prompt for changing the display state after the image generation circuit generates the second image.

17. The mobile phone device according to claim 1, further comprising a vibrator, wherein the mobile phone device is configured to drive the vibrator to notify the first user that generation of the second image is completed.

18. The mobile phone device according to claim 1, wherein the first display state is a closed state of the mobile phone device and the second display state is an open state of the mobile phone device.

19. The mobile phone device according to claim 1, wherein the identification information is acquired by the communication circuit upon establishing communication with the another phone device, and the image generation circuit commences generation of the second image upon acquisition of the identification information while the display state is the first display state.

* * * * *